US011769600B2

(12) United States Patent
Stauff et al.

(10) Patent No.: US 11,769,600 B2
(45) Date of Patent: Sep. 26, 2023

(54) HEAT TRANSFER MODULE (71) Applicant: UCHICAGO ARGONNE, LLC, Chicago, IL (US)

(72) Inventors: Nicolas E. Stauff, Oak Park, IL (US); Yinbin Miao, Naperville, IL (US); Abdellatif M. Yacout, Naperville, IL (US); Taek K. Kim, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 575 days.

(21) Appl. No.: 17/011,744

(22) Filed: Sep. 3, 2020

(65) Prior Publication Data
US 2022/0068513 A1   Mar. 3, 2022

(51) Int. Cl.
*G21C 15/257* (2006.01)
*F28F 21/08* (2006.01)
*F28D 15/04* (2006.01)

(52) U.S. Cl.
CPC ......... *G21C 15/257* (2013.01); *F28D 15/046* (2013.01); *F28F 21/081* (2013.01)

(58) Field of Classification Search
CPC ..... G21C 15/257; F28F 21/081; F28D 15/046
See application file for complete search history.

(56) References Cited

U.S. PATENT DOCUMENTS

| 2007/0017814 A1* | 1/2007 | Hwang | C25D 5/022 |
| | | | 205/118 |
| 2010/0040187 A1 | 2/2010 | Ahlfeld et al. | |
| 2013/0048250 A1 | 2/2013 | Pokharna et al. | |
| 2015/0063523 A1 | 3/2015 | Yacout et al. | |
| 2017/0249999 A1* | 8/2017 | DeWitte | G21C 7/02 |
| 2017/0328647 A1 | 11/2017 | Aston et al. | |

FOREIGN PATENT DOCUMENTS

CN   110491533 A   11/2019

OTHER PUBLICATIONS

P. Mcclure, "Design of Megawatt Power Level Heat Pipe Reactors," LA-UR-15-28840, Nov. 12, 2015.
Faghri, Amir. Heat pipe science and technology. Global Digital Press, 1995.
C. Matthews, LANL-ARPA-E, "Task 1: Evaluation of M&S tools for micro-reactor concepts", Mar. 19, 2019.
P. Sabharwall, INL/EXT-19-55159, "Application of Integrated Modeling and Simulation Capabilities for Full Scale Multiphysics Simulation ofMicroreactor Concepts," Aug. 2019.

* cited by examiner

*Primary Examiner* — Devon Russell
(74) *Attorney, Agent, or Firm* — MARSHALL, GERSTEIN & BORUN LLP (57) ABSTRACT

A heat transfer module can include an envelope sealed to define an internal volume that contains a working fluid and a wick disposed on an internal surface of the envelope. The wick and envelope each has a first portion extending through an evaporator region and a second portion extending through adiabatic and condenser regions. The first portion of the wick is a metal hydride. The first portion of the envelope includes a metal liner surrounding the first portion of the wick, a first diffusion barrier layer disposed between the first portion of the wick and the metal liner, and a ceramic matrix composite cladding surrounding the metal liner. The second portions of the wick and envelope each includes a refractory metal and/or stainless steel.

20 Claims, 6 Drawing Sheets

HEAT TRANSFER MODULE

STATEMENT OF GOVERNMENT SUPPORT

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

Field of the Disclosure

The disclosure relates to a heat transfer module and more particularly to a heat transfer module with high heat transfer efficiency having improved neutron transparency. The heat transfer module can be suitable for high temperature operation and can provide additional negative neutronic feedback.

Brief Description of Related Technology

Heat pipe technology is being explored as a heat transfer mechanism for nuclear energy applications, particularly for space and micro nuclear reactor applications. A heat pipe utilizes the phase transition of the working fluid to transport fission-generated heat from the fuels region to a secondary circuit where thermal energy is converted into electricity. The heat pipe cooling concept provides enhanced core safety by enabling completely passive heat removal from the core without relying on pumping power and any moving parts, including for decay heat removal.

A heat pipe typically includes three major components: (1) a sealed containment called an envelope; (2) a thin wick of porous or grooved material with high thermal conductivity; and (3) a small amount of working fluid. The three components need to be made of materials that are compatible with each other at the operating temperature. For high-temperature heat pipes used in nuclear reactors, the envelope material is typically stainless steel or refractory metal alloys. The thin wick is designed to accommodate working fluid so that the working fluid can evaporate and condense back. More importantly, the porous wick surface needs to be wettable to the working fluid so that the working fluid can transfer within the wick through capillary effect. Stainless steel and refractory metal alloys are also common materials for the wick in high-temperature applications. The working fluid evaporates at the hot side of the heat pipe and condenses at the cold side of the heat pipe, conducting heat from one side to the other. The selection of working fluid depends on the operating temperature. For nuclear reactor applications, which have operating temperatures of 400° C. and above, alkali metals are common choices.

Space and micro nuclear reactors are required to minimize the core volume while using low-enriched uranium (LEU), which can be achieved with thermal neutron spectrum where neutrons have higher probability to interact with fissile material. TRi-structural ISOtropic (TRISO) fuel can also be used to enable enhanced inherent safety, and does entail a thermalized neutron spectrum. However, at low energy range, neutrons are excessively absorbed by the structural materials, like steel or refractory metals, currently used in typical heat pipe structures and wicks. This results in poor neutron economics with current designs.

Aside from neutron economic concerns, micro and space nuclear reactors also rely heavily on inherent safety and autonomous control mechanism. Power variations on the secondary side are propagated through the core through changes in coolant and structure temperatures and the reactivity of the core adjusts itself through thermal expansion feedback mechanism. While these feedback mechanisms are well established, their kinetics can be relatively slow, and their reactivity impact may not be large enough. This would entail relatively significant changes in operation temperatures and mechanical stresses under power transient scenarios.

SUMMARY

The heat transfer modules in accordance with the disclosure can provide nuclear reactors operating with thermalized neutron spectrum with highly efficient heat transfer, and without significant neutron penalty. In embodiments, at least the portions of the heat transfer modules of the disclosure disposed within the core regions can include materials that are transparent to thermal neutrons. Further, the heat transfer modules of the disclosure can provide an efficient reactivity feedback mechanism to stabilize a core power during transients.

In accordance with embodiments of the disclosure, a heat transfer module can include an evaporator region, a condenser region, and an adiabatic region disposed between the condenser region and the evaporator region. The heat transfer module has an envelope sealed to define an internal volume that contains a working fluid and a wick disposed on an internal surface of the envelope. The wick comprises a first portion extending through the evaporator region and a second portion extending through the adiabatic and condenser regions. The first portion of the wick can be a hydrided metal and the second portion of the wick can be stainless steel or a refractory metal. The envelope comprises a first portion extending through the evaporator region and a second portion extending through the adiabatic and condenser regions. The first portion of the envelope comprises a liner surrounding the first portion of the wick, a first diffusion barrier layer disposed between the first portion of the wick and the liner, and a ceramic matrix composite cladding surrounding the liner. The second portion of the envelope comprises a refractory metal and/or stainless steel. The liner can be a refractory metal, refractory metal alloy, and/or stainless steel.

DETAILED DESCRIPTION

Heat transfer modules, which present little to no neutron penalty are provided herein through the use of neutron transparent materials in the portion of the modules present in the core region. Heat transfer modules of the disclosure have three regions: evaporator, adiabatic, and condenser regions. The evaporator region is present in the core and advantageously includes thermal neutron transparent materials. This can make the heat transfer modules of the disclosure particularly suitable for use in reactors utilizing thermalized neutron spectrum. Heat transfer modules in accordance with the disclosure can have increased, and in embodiments significantly increased, k-inf values as compared to a similar fuel assembly using conventional heat transfer modules. This is indicative of the improved neutronic transparency achieved by heat transfer modules in accordance with the disclosure.

Figure 1:
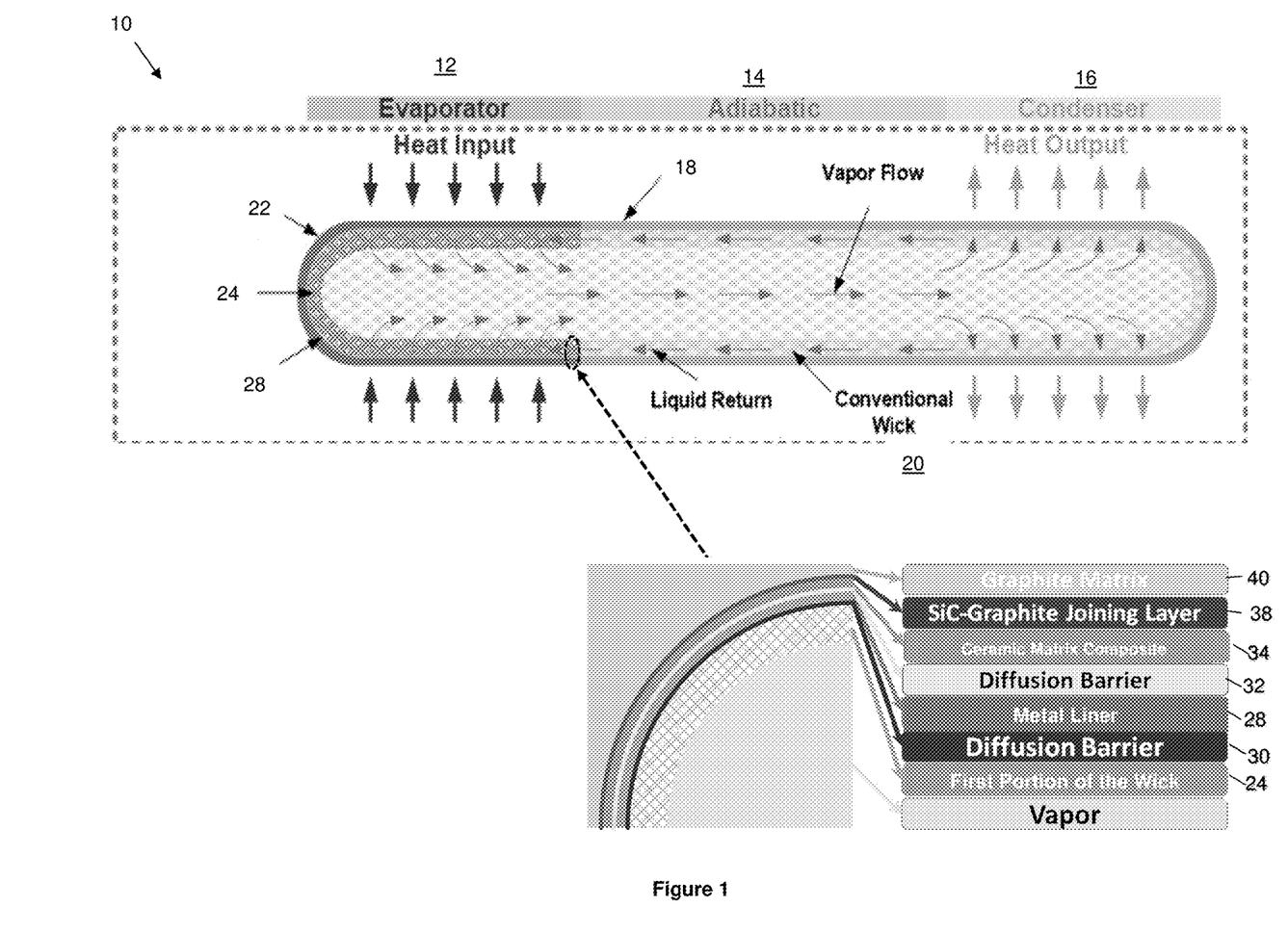
FIG. 1 is a schematic illustration of a heat transfer module in accordance with the disclosure, with the inset showing the structure of the first portion of the envelope which extends through the evaporator region.

As illustrated in FIG. 1, a heat transfer module 10 includes three regions; an evaporator region 12, an adiabatic region 14, and a condenser region 16. The heat transfer module 10 is a vacuum seal structure that includes an envelope that surrounds an internal volume that contains a working fluid 26. A wick is disposed on an internal surface of the envelope. A first portion of the wick 24 and a first portion of the envelope 22 extend through the evaporator region 12 and a second portion of the wick 20 and a second portion of the envelope 18, each extends through the adiabatic and condenser regions 14, 16.

The second portion of the envelope 18 and second portion of the wick 20 that extend through adiabatic and condenser regions 14, 16 can be formed of materials conventionally used in a heat pipe. For example, the second portion of the envelope 18 and the second portion of the wick 20 can be formed of stainless steel and/or a refractory metal. Refractory metals include, for example, Nb, Mo, W, Ti, Ta, Re, alloys thereof, and combinations thereof. The second portion of the envelope 18 and second portion of the wick 20 can be the same or different materials.

The second portion of the envelope can have a thickness of about 0.1 mm to about 1 mm, about 0.3 mm to about 0.6 mm, about 0.4 mm to about 0.7 mm. Other suitable thicknesses include about 0.1, 0.2, 0.3, 0.4, 0.5, 0.6, 0.7, 0.8, 0.9, and 1 mm.

The second portion of the wick can have a thickness of about 0.2 mm to about 1 mm, about 0.3 mm to about 0.9 mm, about 0.4 mm to about 0.7 mm, or about 0.2 mm to about 0.5 mm. Other suitable thicknesses include about 0.2, 0.3, 0.4, 0.5, 0.6, 0.7, 0.8, 0.9, and 1 mm.

In embodiments, in the evaporator region 12, the first portion of the wick 22 is a hydrided metal. Suitable hydrided metals can include, for example, $YH_x$, $ZrH_x$, $ScH_x$, $TiH_x$, $LiH_x$, $CaH_x$, and combinations thereof. In the hydrided metals, x can have a value between 0.1 and 10. The value of x can be tuned to provide difference performance parameters. Adjusting the stoichiometry of the hydrided metal through variation of x changes the equilibrium of hydrogen concentration between the hydride and the liquid metal, thereby allowing for tuning of the performance parameter of the wick. The hydrided metals can include deuterided metals and metals that are hydrided and deuterided. For ease of reference herein, the term "hydrided metal" will be used herein and should be understood to include hydrided, deuterided, and combinations of hydrided and deuterided metals. The value of x can between 0.1 and 10, between 1 and 3, about 0.5 and 5, or about 2 to 4. Other suitable values of x can include 0.1, 0.2, 0.3, 0.4, 0.5, 0.6, 0.7, 0.8, 0.9, 1, 2, 3, 4, 5, 6, 7, 8, 9, or 10. For example, the hydrided metal wick can be a material of formula $AR_x$, wherein A is one or more of Zr, Y, Ti, Li, Ca, Sc, or combinations thereof; each R is independently H or D; and x is in a range of 0.1 to 10 and all values in between as detailed above. The hydrided metal wick can provide high heat transfer mechanism with neutron moderation that is a benefit to overall neutron economy. Further, as discussed in detail below, the thermal dissociation phenomenon of hydrided metal provides a useful reactivity feedback mechanism to enhance safety during a power transient.

In embodiments, the first portion of the wick 24 can have a thickness of about 0.2 mm to about 1 mm, about 0.3 mm to about 0.9 mm, about 0.4 mm to about 0.7 mm, or about 0.2 mm to about 0.5 mm. Other suitable thicknesses include about 0.2, 0.3, 0.4, 0.5, 0.6, 0.7, 0.8, 0.9, and 1 mm.

The first portion of the wick 24, which extends through the evaporator region 12, can be different from the second portion of the wick 20, which extends through the adiabatic and condenser regions. In embodiments, all or a portion of the second portion of the wick can be formed of a metal that is not easily hydride. The first and second portions of the wick 24, 20 can be formed within the envelope or formed and then applied to the interior surface of the envelope. The first and second portions of the wick 24, 20 can be joined during formation or be disposed next to each other, without further bonding between the two portions. Any wick type can be used, including sintered, grooved, and mesh types of wicks. The first and second portions of the wick can be two distinct wicks having the same or different structure. The portions of the wick can be formed by methods as known in the art. For example, the first portion of the wick can be made directly of a hydrided metal or can be made of a metal that is then subsequently hydrided.

In embodiments, the first portion of the envelope 22 can be formed separately from the second portion of the envelope 18, and the first and second portions of the wick 24, 20 can be formed on an interior surface of the separate envelope portions 22, 18 prior to joining the two envelope portions to form the sealed structure. Alternatively, in embodiments, distinct metals can be placed in the evaporator regions and adiabatic and condenser regions in an already joined or unitarily formed envelope structure and sintered to form the two portions of the wick in the respective regions.

In the evaporator region 12, the first portion of the envelope 22 can have a layered structure that includes a metal liner 28, a first diffusion barrier layer 30 disposed between the metal liner 28 and the first portion of the wick 24, a ceramic matrix composite cladding 34 surrounding the metal liner 28 on a side opposite the first diffusion barrier layer 30. The first portion of envelope 22 can further include a second diffusion barrier layer 32 disposed between the metal liner 28 and the ceramic composite matrix cladding 34. The metal liner 28 is ductile and radiation tolerant and can maintain integrity under thermal shocks and high irradiation. The heat transfer modules 10 of the disclosure can advantageously use a reduced thickness metal liner 28 in the evaporator region 12, as compared to conventional systems or the refractory metal or stainless steel second envelope portion 18 of the adiabatic and condenser regions 16, 18. This is beneficial to neutron economy. The reduction in the metal liner 28 thickness is achievable through the addition of the ceramic matrix composite cladding 34, which provides the high-temperature mechanical strength. Advantageously, the ceramic matrix composite cladding 34 is capable of providing this high-temperature mechanical strength without introducing extraneous neutron penalty.

The first portion of the envelope 22 in the evaporator region 12 can have a total thickness of about 0.3 mm to about 0.6 mm, about 0.4 mm to about 0.7 mm. Other suitable thicknesses include about 0.1, 0.2, 0.3, 0.4, 0.5, 0.6, 0.7, 0.8, 0.9, and 1 mm. The thickness of the first portion of the envelope 22 in the evaporator region 12 can be substantially the same as the thickness of the second portion of the envelope 18 in the adiabatic and condenser regions 14, 16.

The metal liner 28 in the first portion of the envelope 22 can be a refractory metal, refractory metal alloy, and/or stainless steel. For example, the metal liner 28 can be a refractory metal or refractory metal alloy selected from one or more of Ti, Nb, Mo, Ta, W, Re, laminates thereof, alloys thereof, and combinations thereof.

The metal liner 28 can have a thickness of about 100 μm to about 500 μm, about 100 μm to about 200 μm, and about 150 μm to about 350 μm. Other suitable thicknesses can include, for example, about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, and 500 μm.

In embodiments, the metal liner 28 can be made from the same materials as the second portion of the envelope 18 in the adiabatic and condenser regions 14, 16. In such embodiments, for example, the sealed wall can be formed of the metal such that the wall has a first thickness in the evaporator region 12 and a second thickness in the adiabatic and condenser regions 14, 16. The first thickness is less than the second thickness. For example, a pipe structure can be formed having a uniform metal wall thickness, which is then subsequently thinned in the evaporator region 12 to the desired thickness of the metal liner 28. As such, the metal in the evaporator region 12 at the first thickness defines the metal liner 28 of the first portion of the envelope 22 and the metal in adiabatic region 14 and condenser region 16 at the second thickness defines the second portion of the envelope 18. The metal in the evaporator region 12 can then be further coated on its exterior surface with the second diffusion barrier layer 32, if present, and the composite ceramic cladding. The metal can have its interior surface coated with a diffusion barrier layer 30 prior to application or formation of the first portion of the wick 24. In alternative embodiments, whether the metal liner 28 and the second portion of the envelope 18 are formed of the same material or not, the first portion of the envelope 22 can be formed separately from the second portion of the envelope 18, and subsequently joined to form the sealed heat transfer module having the internal volume for the working fluid (not shown).

The ceramic matrix composite cladding 34 can include, for example, $SiC_f/SiC$, $C_f/SiC$, and $C_f/C$. The composite ceramic cladding 34 can be or can include a reinforcement phase (A) and a matrix phase (B). In embodiments, the reinforcement phase can include ceramic reinforcement and the matrix phase can include a ceramic matrix, wherein the notation is as follows: type of reinforcement/type of matrix (e.g., $C_f/SiC$ is carbon fiber reinforced silicon carbide). The reinforcement phase can be, for example, fibers, particles, meshes, and other such structures as is known in the art. In embodiments, the ceramic matrix composite cladding 34 can include ceramic fibers embedded in the ceramic matrix. In embodiments, the ceramic matrix composite cladding 34 includes one or more of SiC, C, $Al_2O_3$, $Al_2O_3$—$SiO_2$, $Si_3N_4$, SiC/SiC, C/SiC, C/C, SiC/C, $Al_2O_3/Al_2O_3$. In embodiments, the ceramic composite matrix cladding 34 includes SiC/SiC. In embodiments, the reinforcement phase can include one or more of SiC, C, $Al_2O_3$, $Al_2O_3$—$SiO_2$, $Si_3N_4$. In embodiments, the matrix phase can include one or more of SiC, C, $Al_2O_3$, $Al_2O_3$—$SiO_2$, $Si_3N_4$. Any combinations of reinforcement phase and matrix phase components can be used. In embodiments, the reinforcement phase can further include an interface coating comprising C, PyC, BN, SiC, $Al_2O_3$, $SiO_2$, $ZrO_2$, AlN, $LaPO_4$, $ErTaO_4$, $MeWO_4$, $MeMoO_4$, $ReTaO_4$, $Re_3NbO_4$, $MgWo_4$, $CaWo_4$, and the like. The interface coating can be any suitable coating known to one of ordinary skill in the art to prevent fusion of the matrix and the reinforcement phases.

The ceramic matrix composite cladding 34 can have a thickness of about 100 μm to 2000 μm, about 100 μm to about 500 μm, about 200 μm to about 750 μm, about 400 μm to about 900 μm, or about 100 μm to about 300 μm. Other suitable thicknesses include about 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1100, 1200, 1300, 1400, 1500, 1600, 1700, 1800, 1900, and 2000 μm.

As used herein, the ceramic matrix composite cladding 34 can be fabricated using any suitable fabrication method known to one of ordinary skill in the art. For example, the ceramic matrix composite cladding 34 can be fabricated using a polymer infiltration and pyrolysis (PIP) method, a chemical vapor infiltration method, a liquid phase infiltration method, a hot press sintering method, or the like. In embodiments, the ceramic matrix composite cladding 34 can be fabricated by polymer infiltration and pyrolysis (PIP) or chemical vapor infiltration.

The first and second diffusion barrier layers 30, 32 can be the same or different materials. In embodiments, the first diffusion barrier layer 30 is a hydrogen diffusion barrier. For example, the first and/or second diffusion barrier layers 30, 32 can be one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, ($ZrO_2 \cdot SiO_2$), ($ZrO_2 \cdot xY_2O_3$).

The first and/or second diffusion barrier layers 30, 32 can have a thickness of about 100 nm to about 20 μm, about 500 nm to about 10 μm, about 100 nm to about 800 nm, about 1 μm to about 5 μm, about 8 μm to about 16 μm, and about 750 nm to about 7 μm. Other suitable values include about 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, and 20 μm.

Any suitable coating methods can be used for forming the first and/or second diffusion barrier layers 30, 32, including, for example, atomic layer deposition (ALD), physical vapor deposition (PVD), chemical vapor deposition (CVD), surface reaction coating, electroplating, and cold/hot spraying. In embodiments, the first and/or second diffusion barrier layers 30, 32 can be an ALD formed layer, which can advantageously provide a pinhole free layer all or substantially all of the surface are of the refractory metal liner 28 and/or ceramic matrix composite cladding 34.

In embodiments, the first and/or second diffusion barrier layers 30, 32 can include multiple layers. In embodiments, the multiple layers include alternating ceramics layers and metal layers. In embodiments, the ceramics layers include one or more of an oxide, a nitride, a carbide, an aluminide, a silicide, an elemental ceramic, a complex oxide, and combinations thereof. In embodiments, the ceramics layers can include one or more of $Al_2O_3$, $Y_2O_3$, $ZrO_2$, $TiO_2$, $SiO_2$, $Cr_2O_3$, ZrN, TiN, AlN, ZrC, TiC, SiC, NbC, FeAl, $FeAl_2$, $Fe_2Al_5$, $ZrAl_3$, $MoSi_2$, $NbSi_2$, Si, $(ZrO_2 \cdot SiO_2)$, $(ZrO_2 \cdot xY_2O_3)$ and combinations thereof. In embodiments, the ceramics layers include one or more of $Al_2O_3$, $ZrO_2$, ZrN, and combinations thereof. In embodiments, the ceramics layers include $Al_2O_3$. For nuclear application, it can be advantageous to avoid the use of an oxide in the ceramic layer, due to radiation enhanced diffusion resulting from such applications. In non-nuclear applications, however, the first and/or second diffusion barrier layers 30, 32 with oxide-based ceramics can be utilized. In embodiments, the metal layers include one or more of refractory metals, high-temperature metals, high-temperature metal alloys, intermetallic compounds, and combinations thereof. In embodiments, the metal layers can include one or more of Mo, W, Nb, Ta, Ni, Co, Fe, Ru, Pd, alloys thereof, and combinations thereof.

Each metal layer and each ceramics layer, independently, can have a thickness on the nanoscale. In embodiments, each metal layer and each ceramics layer, independently, can have a thickness about 5 nm to about 1000 nm. In embodiments, each metal layer and each ceramic layer, independently, can have a thickness of about 5 nm to about 100 nm or about 5 nm to about 50 nm. In embodiments, each metal layer can have a thickness of about 25 nm to about 75 nm and each ceramics layer can have a thickness of about 5 nm to about 25 nm. For example, each metal layer can have a thickness of about 50 nm and each ceramics layer can have a thickness of about 15 nm.

In embodiments, the first and/or second diffusion barrier layers 30, 32 can have about 4 to 50 metal layers and ceramics layers total. For example, the first and/or second diffusion barrier layers 30, 32 can have about 4 to 45, or 4 to 40, or 4 to 30, or 4 to 20, or 10 to 50, or 10 to 40, or 10 to 30, or 20 to 40, metal layers and ceramics layers combined. In embodiments, the first and/or second diffusion barrier layers 30, 32 can have about 12 to about 18 metal layers, and about 12 to 18 ceramics layers.

In embodiments, the first and/or diffusion barrier layers 30, 32 can have a defined microstructure. In embodiments, the microstructure can be crystalline with nano- or ultra-sized grains. In embodiments, the grains can be equiaxed. In embodiments, the diffusion barrier layer has both (i) an ultra- and/or nano-crystalline structure and (ii) equiaxed grains. Nano-size grains generally have a grain size of about 0.1 nm to about 100 nm, and ultra-sized grains generally have a grain size of about 100 nm to about 500 nm.

In embodiments in which the first and/or second diffusion barrier layers 30, 32 are a multi-layer structure, one or more of the individual layers can have a microstructure as described above, while other layers have different microstructures. For example, a diffusion barrier multi-layer structure having a ceramic layer and a metal layer can have an amorphous ceramic layer and a metal layer with an ultra and/or nano-crystalline structure with or without equiaxed grains. Various combinations of microstructures in a multi-layer structure can be used. For example, a multi-layer structure can include one or more of the following microstructures in the individual layers, an amorphous microstructure, a nanocrystalline microstructure with equiaxed grains, an ultracrystalline microstructure with equiaxed grains, a microstructure having larger than ultra-sized grains, but with equiaxed grains, a nanocrystalline microstructure without equiaxed grains, and an ultracrystalline microstructure without equiaxed grains. In embodiments, the entire diffusion barrier layer can have a microstructure that is nano- and/or ultra-crystalline with equiaxed grains.

In embodiments, the first diffusion barrier layer 30 is a $H_2$ permeation barrier. In embodiments, the first diffusion barrier layer 30 and/or the second diffusion barrier layer 32 can be monolithic and substantially pinhole free. Surfaces that are "substantially pinhole free" can have less than 1% pinholes after deposition, or less than 0.1% pinholes, or less than 0.001% pinholes after deposition. Measurements for pinhole density can be found in Chai, Zhimin, Yuhong Liu, Jing Li, Xinchun Lu, and Dannong He. "Ultra-thin $Al_2O_3$ films grown by atomic layer deposition for corrosion protection of copper." *RSC Advances* 4, no. 92 (2014): 50503-50509. In embodiments, the first and/or second barrier layer can be deposited by atomic layer deposition.

Additional examples of diffusion barrier layers can be found, for example, in U.S. Patent Application Publication No. 2015/0063523 and U.S. patent application Ser. No. 16/925,782, the disclosures of which is incorporated herein by reference.

In embodiments, the first portion of the wick can be a conventional wick material, such as a refractory metal, refractory metal alloy, or stainless steel, as described above for forming the second portion of the wick. In such embodiments, the first portion of the envelope has a structure as described above, including the metal liner and ceramic composite matrix layer, allowing for benefits of improved neutronic transparency and improved compatibility with reactor matrix, which is typically made of ceramics such as graphite and SiC.

In other embodiments, the first and second portions of the wick can both be a hydrided metal as described in detail above for the first portion of the wick. In such embodiments, the first and second portions of the envelope can be as described in detail above. In such embodiments, temperature differences throughout the evaporator, adiabatic, and condenser regions can allow for adjustment of the hydrogen content and generation of a negative reactivity coefficient for inherent safety during core overheating, as detailed below. That is the hydrogen content is provided in a gradient throughout the entire hydrided wick under the temperature gradient (Soret effect).

In other embodiments, the first portion of the wick and/or the second portion of the wick can have a gradient ratio of hydrided material to non-hydrided material. For example, all or a part of the first portion of the wick can be a hydrided metal. The concentration of the hydrided metal can then be tapered off along some portion of the first and/or second portion of the wick. For example, the transition region, in which a gradient ratio of hydrided material to non-hydrided material is provided, can be at the interface between the first portion and the second portion of the wick. For example, the transition region can be provided in the second portion of the wick in the adiabatic region such that the first portion of the wick in the evaporator region is the hydrided material and the second portion of the wick in the condenser region is a non-hydrided material, and a gradient ratio of hydrided and non-hydrided metal is provided in the transition region there between. In other examples, transition region can be provided within the first portion of the wick in the evaporator region, at the interface between the first and second portions, or within either or both the adiabatic region and condenser region. The transition region can be in any portion of the heat transfer module and can extend any length of the heat transfer module. The gradient ratio of the hydrided material to the non-hydrided material in the transition region can be tailored for a given application.

In embodiments, a gradient of the hydrided metal and the non-hydrided metal of the wick can be provided in the transition region by mixing hydrided and non-hydrided metal particles in varying ratios to provide the gradient desired, and sintering the mixed particles to thereby provide the gradient of the hydrogen content in the transition region.

In any of the embodiments herein, a thin layer of working fluid 36 can be entrapped between the wick and the first diffusion barrier layer 30. This additional layer of working fluid can enhance the thermal bonding, relieve the potential interaction between the envelop and the wick, and/or serve as an extra reservoir of fluid. The gap between the envelop and the wick needed to hold the thin layer of working fluid can be formed, for example, by inserting the wick into the envelop without joining the two together, thereby forming the needed gap for this thin layer of working fluid.

The working fluid can be any suitable liquid alkali metal. For example, the working fluid can include Li, Na, K and mixtures thereof. For example, the working fluid can be liquid NaK.

Embodiments of the disclosure can further include additional layers. For example, a high-conductivity joining layer 38 can be provided on an external surface of the ceramic matrix composite cladding. This layer can aid in applications in which the ceramic matrix composite cladding is joined to other structures, for example, for joining to a matrix such as graphite 40.

Figure 2A:
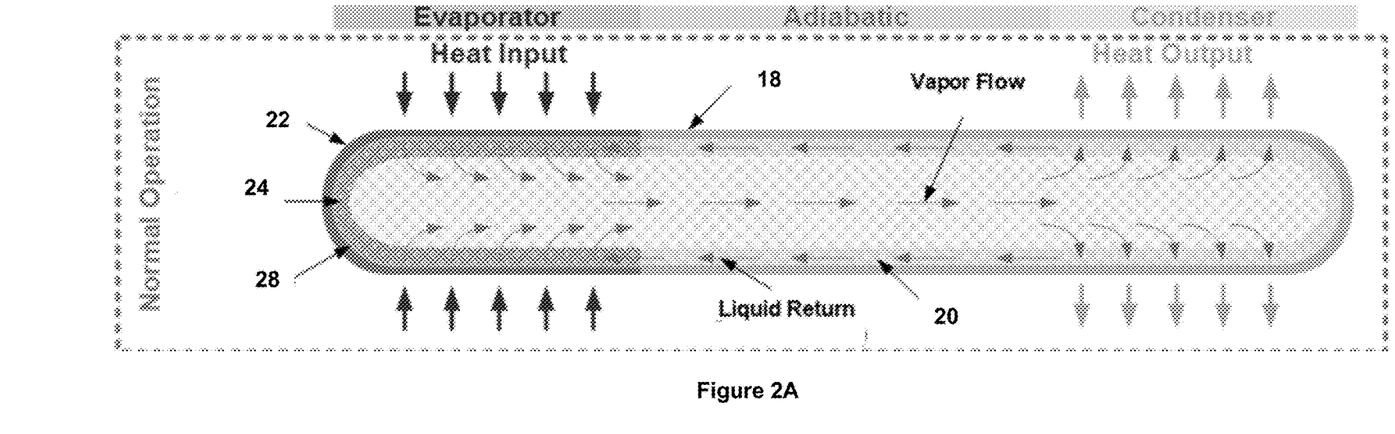
FIG. 2A is a schematic illustration of a heat transfer module in accordance with the disclosure during normal operation.

Referring to FIG. 2A, in normal operation, the heat transfer modules 10 of the disclosure function using the principles of a conventional heat pipe. Phase transition and mass transfer of the working fluid 26 contribute to the heat transfer within the module. Advantageously, and unlike conventional heat pipe technology, heat transfer modules 10 in accordance with the disclosure can provide a small amount of temperature dependent moderation through hydrogen dissociation. Hydrogen stays in the first portion of the wick 24 of the evaporator region 12 of the heat transfer modules 10 to help moderate neutrons.

Figure 2B:
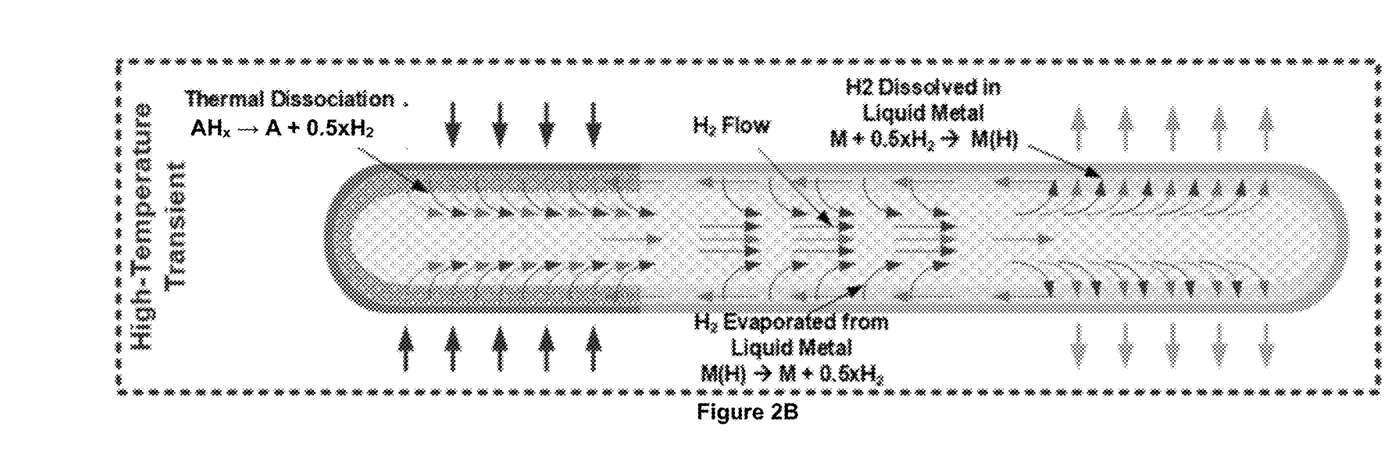
FIG. 2B is a schematic illustration of a heat transfer module in accordance with the disclosure during a power transient.
Figure 2C:
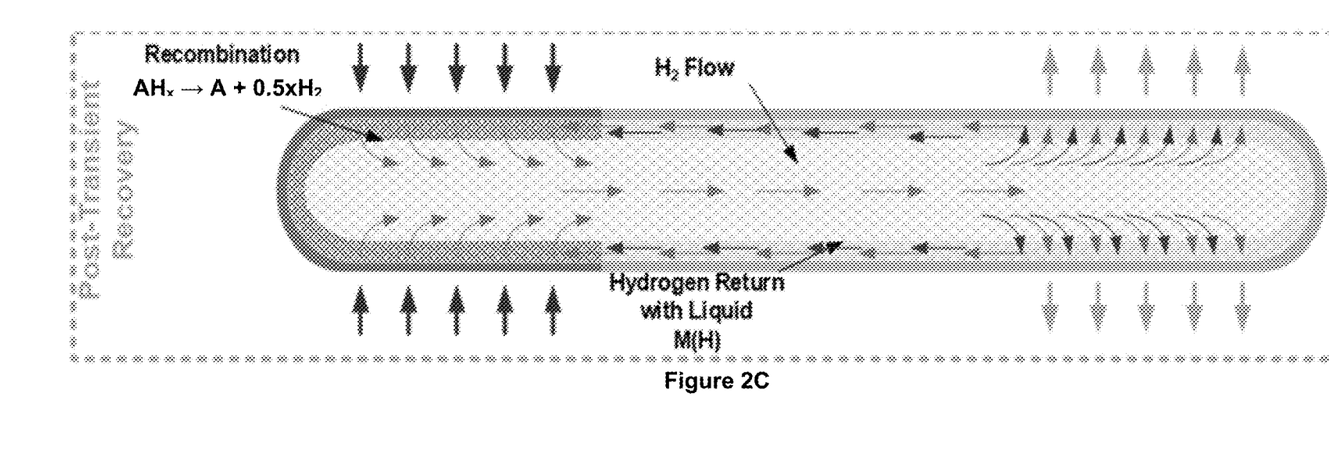
FIG. 2C is a schematic illustration of a heat transfer module in accordance with the disclosure after the power transient.

Referring to FIG. 2B, when the core is overheated during power transients, the thermal dissociation of the metal hydride in the first portion of the wick 24 in the evaporator region 12 can enhance the inherent safety by providing a negative reactivity coefficient. The dissociation process is endothermic and therefore facilitates the removal of heat from the core regions. As illustrated in FIGS. 2B and 2C, the dissociated hydrogen can be solvated into the working fluid 26 in the condenser region 16. Referring to FIG. 2C, when the transient is over, the hydrogen dissolved in the working fluid 26 can be recombined with the metal hydride in the first portion of the wick 24 in the evaporator region 12. Thus, the process is fully reversible. This phenomenon further can provide enhanced autonomous control of the reactor by providing an almost instantaneous neutronic power stabilization following reactor transient. The dissociation process provides an additional negative neutronic feedback mechanism that is directly linked to changes in working fluid temperature.

Further, the hydrogen dissociation mechanism can allow the operating temperature and transient temperature range of the heat transfer modules of the disclosures to be tuned by selection of the metal hydride used for the first portion of the wick, the working fluid, and the loaded hydrogen amount in the wick from the hydrided metal wick. As described the hydrided metal wick can be represented by formula $MH_x$ where M is a metal and x describes the loaded hydrogen amount.

The heat transfer modules of the disclosure can be utilized in various nuclear applications, as well as for non-nuclear application, particularly where very high temperature conditions are required.

EXAMPLE

Performance of a heat transfer module in accordance with the disclosure was simulated using Heat Pipe heat conduction capability of the System Analysis Module (SAM) code. The heat transfer module in accordance with the disclosure had a $YH_2$ wick in the evaporator region (first portion of the wick). The wick structure had a volume fraction of porosity of 50% Na. This parameter was used in the simulation to calculate the thermal conduction parameters of the wick material (K, Cp, Rho), using Maxwell liquid saturated spheres model for the thermal conductivity of the wick. The heat-pipe simulated has an evaporator region of 1.0 m, adiabatic region of 0.4 m, and condenser region of 0.6 m. The external radius of the heat-pipe is 1 cm, with 1 mm-thick envelope, and 0.5 mm-thick wick. The first portion of the envelope included a niobium refractory metal liner. The $H_2$ permeation barrier and second diffusion barrier layer were omitted from the simulation due to their small thicknesses and negligible impact on neutronics and heat transfer.

As shown in Table 1, the simulation found that the heat transfer module in accordance with the disclosure had 28% lower heat removal performance as compared to a conventional heat pipe design using SS316 stainless steel when setting the temperature of the evaporator to 900K and from the condenser to 800K. This simulation showed the impact of different wick and envelope types on the heat removal rate. The full heat pipe was modeled, with evaporator, adiabatic, and condenser regions. In this model, all three regions had the same materials, as the simulation did not allow for altering the materials in different regions (e.g., the adiabatic and condenser regions) of the simulated heat pipe.

While the heat pipe structure in accordance with embodiments of the disclosure had a slightly negative impact on heat transfer performance, there were significant benefits to neutronics. Further, given that the adiabatic and condenser regions included the same materials as the evaporator region rather than a conventional evaporator and wick structure as described above, it is anticipated that the heat transfer performance of a heat transfer module in accordance with the disclosure, which has conventional envelope and wick materials in the condenser and adiabatic region and in particular different materials than in the evaporator region, would have improved heat transfer performance than demonstrated by the simulation.

TABLE 1

| Material in heat transfer module gas/wick/envelope | Fixed Temp Heat Removal Rate (kW) |
|---|---|
| Vapor/SS316 + 50% Na/ SS316 (conventional) | 3.3 |
| Vapor/$YH_2$ + 50% Na/ SiC (VHTM) | 2.4 |

Figure 3:
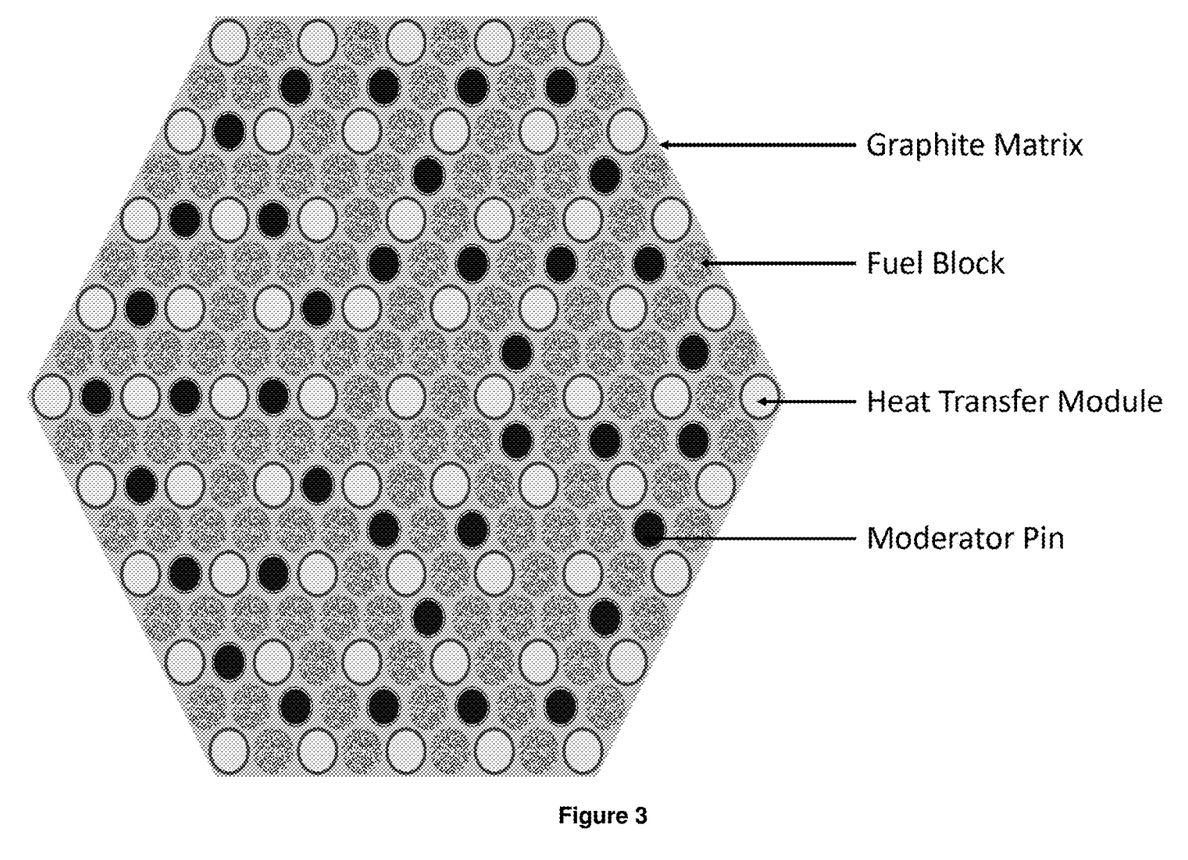
FIG. 3 is a schematic illustration of an assembly configuration using a heat transfer module of the disclosure.

FIG. 3 shows an assembly configuration where the heat-transfer module. Materials used for both heat transfer module in accordance with the disclosure (VHTM) and the conventional heat transfer module are described in Table 1. For this simulation using the SERPENT2 code with ENDF/B-VII.1 nuclear data library, 3D reflective boundary conditions were assumed, and all the materials are assumed at 300K. The fuel assumes TRISO-UCO fuel with 40% packing fraction. As shown in Table 2, the simulation further demonstrated that the heat transfer module of the disclosure in various configurations has neutronic benefits with significantly increased k-inf, which can enable reducing the core size or uranium enrichment. This increase of k-inf is indicative of the improved neutronic transparency achieved by the heat transfer modules of the disclosure. The hydrogen dissociation from the wick was estimated at −825 pcm. This is indicative that the heat transfer modules in accordance with the disclosure have a negative reactivity coefficient.

TABLE 2

| Heat transfer module | K-inf |
|---|---|
| conventional | 1.265 |
| VHTM | 1.470 (H total dissociation from wick-825 pcm) |

Figure 4A:
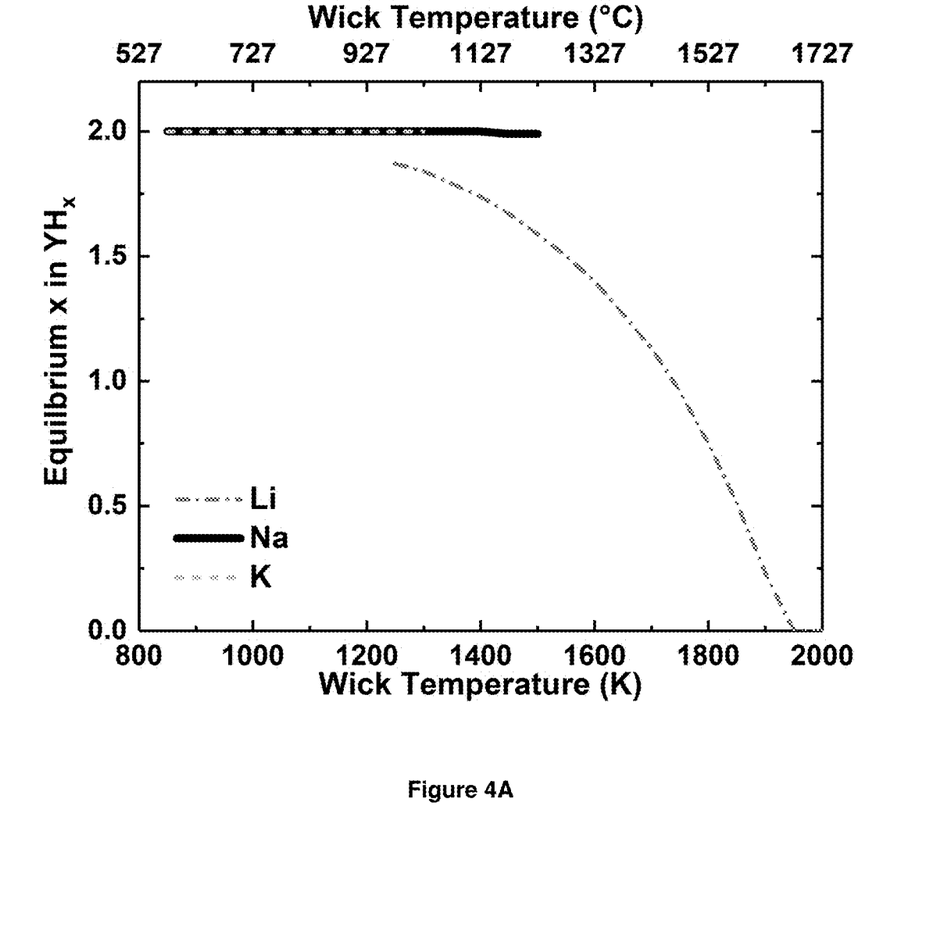
FIG. 4A is a graph illustrating hydrogen dissociation for a YHx first wick portion as a function of temperature for three working fluids, Li, Na, and K.
Figure 4B:
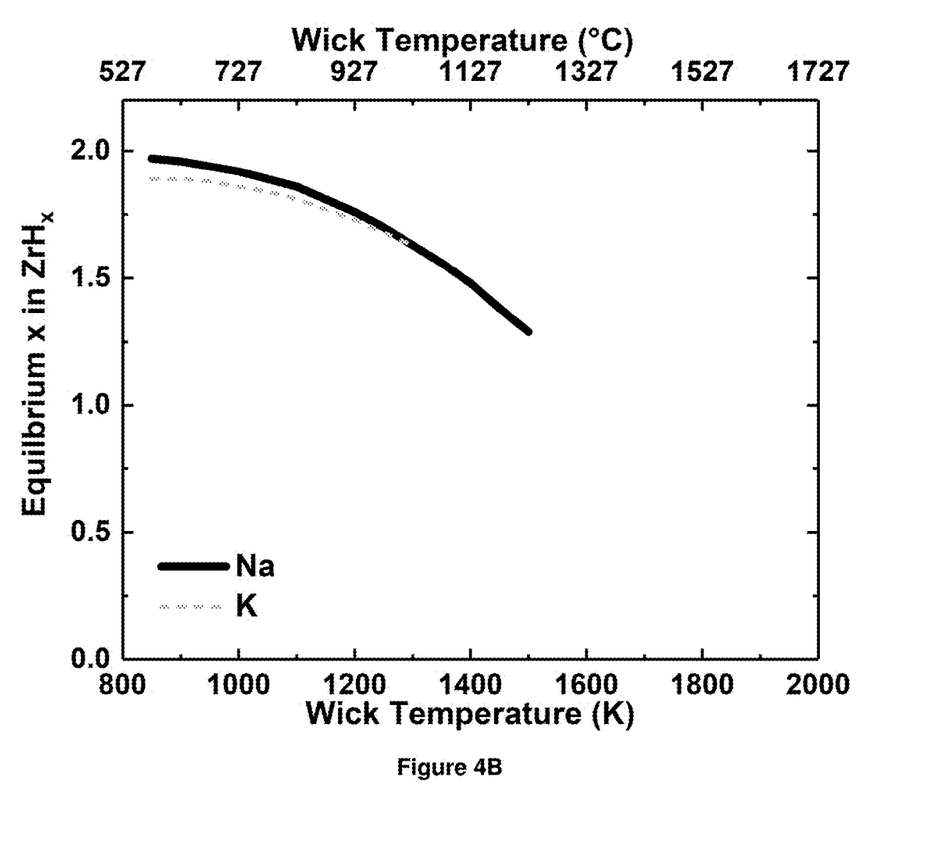
FIG. 4B is a graph illustrating hydrogen dissociation for a ZrHx first wick portion as a function of temperature for two working fluids, Na and K.

The simulation further analyzed the hydrogen dissociation flexibility achievable with the heat transfer module in accordance with the disclosure. It was found that different working fluids lead to hydrogen dissociation in different temperature regimes. FIG. 4A show the hydrogen dissociation as a function of temperature for a YHx wick in three different working fluids—Li, Na, and K. FIG. 4B shows the hydrogen dissociation as a function of temperature for a ZrHx wick in two different working fluids—Na and K. The simulation demonstrated that useful temperature ranges can be for potassium working fluid about 773-1273K, for sodium working fluid about 873-1473K, and for lithium working fluid about 1273-2073K. It has advantageously been determined that the curves can be further tuned by adjusting the geometry, hydrogen loading, and materials. Addition of gas plenum or liquid reservoir may also be used to tune the curve.

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A heat transfer module comprising an evaporator region, a condenser region, and an adiabatic region disposed between the condenser region and the evaporator region, the heat transfer module comprising:
    an envelope sealed to define an internal volume that contains a working fluid and a wick disposed on an internal surface of the envelope, wherein:
    the wick comprises a first portion extending through the evaporator region and a second portion extending through the adiabatic and condenser regions,
    the first portion of the wick comprise a metal hydride and the second portion of the wick comprises stainless steel or a refractory metal,
    the envelope comprises a first portion extending through the evaporator region and a second portion extending through the adiabatic and condenser regions,
    the first portion of the envelope comprises:
        a metal liner surrounding the first portion of the wick;
        a first diffusion barrier layer disposed between the first portion of the wick and the metal liner; and
        a ceramic matrix composite cladding surrounding the metal liner;
    the second portion of the envelope comprises a refractory metal and/or stainless steel.

2. The heat transfer module of claim 1, wherein working fluid is a liquid alalki metal, and the liquid alkali metal is one or more of Li, K, and Na.

3. The heat transfer module of claim 1, wherein the first portion of the wick is a metal hydride of formula $AR_x$, wherein A is one or more of Zr, Y, Ti, Li, Ca, Sc, or combinations thereof; each R is independently H or D; and x is in a range of 0.1 to 10.

4. The heat transfer module of claim 1, wherein the metal liner is a refractory metal, refractory metal alloy, or stainless steel.

5. The heat transfer module of claim 4, wherein the metal liner is one or more of Ti, Nb, Mo, Ta, W, Re, laminates thereof, alloys thereof, and combinations thereof.

6. The heat transfer module of claim 1, wherein the first diffusion barrier layer comprise one or more of one or more of oxides, nitrides, carbides, aluminides, silicides, elemental ceramics, and complex oxides.

7. The heat transfer module of claim 1, wherein the first diffusion barrier layer comprise one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2 \cdot SiO_2)$, and $(ZrO_2 \cdot xY_2O_3)$.

8. The heat transfer module of claim 1, wherein the first barrier layer comprises alternating ceramics layers and metal layers, wherein the ceramics layers comprise one or more of oxides, nitrides, carbides, aluminides, silicides, elemental ceramics, and complex oxides; and the metal layers comprise one or more of refractory metals, high-temperature metals, high-temperature metal alloys, and intermetallic compounds.

9. The heat transfer module of claim 8, wherein the ceramics layers comprise one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2 \cdot SiO_2)$, and $(ZrO_2 \cdot xY_2O_3)$.

10. The heat transfer module of claim 8, wherein the metal layers comprise one or more of Mo, W, Nb, Ta, Ni, Co, Fe, Ru, Pd, and alloys thereof.

11. The heat transfer module of claim 1, further comprising a second diffusion barrier layer disposed between the refractory metal liner and the ceramic matrix composite.

12. The heat transfer module of claim 11, wherein the second diffusion barrier layer comprise one or more of one or more of oxides, nitrides, carbides, aluminides, silicides, elemental ceramics, and complex oxides.

13. The heat transfer module of claim 11, wherein the second diffusion barrier layer comprise one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2 \cdot SiO_2)$, and $(ZrO_2 \cdot xY_2O_3)$.

14. The heat transfer module of claim 11, wherein the second diffusion barrier layer comprises alternating ceramics layers and metal layers, wherein the ceramics layers comprise one or more of oxides, nitrides, carbides, aluminides, silicides, elemental ceramics, and complex oxides; and the metal layers comprise one or more of refractory metals, high-temperature metals, high-temperature metal alloys, and intermetallic compounds.

15. The heat transfer module of claim 14, wherein the ceramics layers comprise one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, $(ZrO_2 \cdot SiO_2)$, and $(ZrO_2 \cdot xY_2O_3)$.

16. The heat transfer module of claim 14, wherein the metal layers comprise one or more of Mo, W, Nb, Ta, Ni, Co, Fe, Ru, Pd, and alloys thereof.

17. The heat transfer module of claim 1, wherein the composite ceramic matrix layer comprises one or more of SiC, C, $Al_2O_3$, $Al_2O_3$—$SiO_2$, $Si_3N_4$, SiC/SiC, C/SiC, C/C, SiC/C, $Al_2O_3/Al_2O_3$, laminates, and multilayers thereof.

18. The heat transfer module of claim 1, wherein the refractory metal liner has a thickness of about 100 μm to about 500 μm.

19. The heat transfer module of claim 1, wherein the envelope comprising a unitary metal layer that extends through the evaporator region, the adiabatic region, and the condenser region, wherein the unitary metal layer has a first thickness in the evaporator region to define the metal liner of the first portion of the envelope and a second thickness in the adiabatic and condenser regions to define the second portion of the envelope, wherein the first thickness is less than the second thickness.

20. The heat transfer module of claim 1, further comprising a liquid alkali fluid disposed between the first portion of the wick and the first diffusion barrier layer.

* * * * *